United States Patent [19]

Geria et al.

[11] 4,147,750

[45] Apr. 3, 1979

[54] METHOD FOR ELIMINATING SHRINKAGE CAVITIES IN CAST COSMETIC STICKS AND SIMILAR PRODUCTS

[75] Inventors: Navin Geria, Elizabeth, N.J.; George Shaleesh, Staten Island, N.Y.

[73] Assignee: Bristol-Myers Company, New York, N.Y.

[21] Appl. No.: 927,438

[22] Filed: Jul. 24, 1978

[51] Int. Cl.² .......................... B29C 5/00; B29F 5/00
[52] U.S. Cl. .................................. 264/255; 264/267; 264/269; 264/299; 264/271; 264/320; 425/DIG. 32
[58] Field of Search ............... 264/239, 299, 241, 250, 264/259, 267, 269, 271, 255; 53/440; 425/803, DIG. 32; 252/89–91, 174, 367, 370, 368; 426/512, 515, 520; 424/71

[56] References Cited

U.S. PATENT DOCUMENTS

| | | | |
|---|---|---|---|
| 2,821,760 | 2/1958 | Kurzinski | 164/123 |
| 3,493,309 | 2/1970 | Grisel | 425/DIG. 32 |
| 4,069,574 | 1/1978 | Krevald et al. | 264/267 |

FOREIGN PATENT DOCUMENTS 1408438 10/1975 United Kingdom ............ 425/DIG. 32

Primary Examiner—W. E. Hoag
Attorney, Agent, or Firm—Irving Holtzman; George A. Mentis; David J. Mugford

[57] ABSTRACT

Prepares a wax-based applicator stick by pouring a melt of said wax-based material into a dispenser container, allowing said material to cool to a semi-solid state, inserting a tubular probe into the center of said mass, withdrawing the same to form a cavity and then flaming the mass to eliminate the cavity so formed.

6 Claims, 8 Drawing Figures

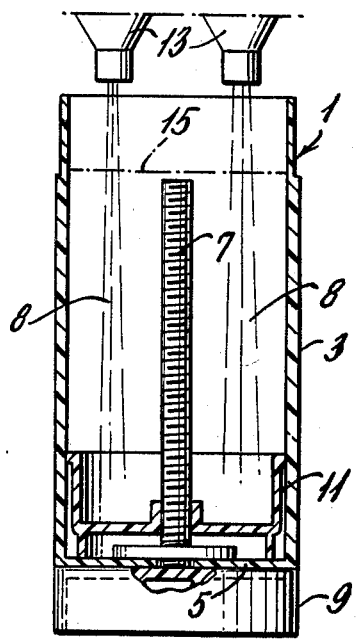
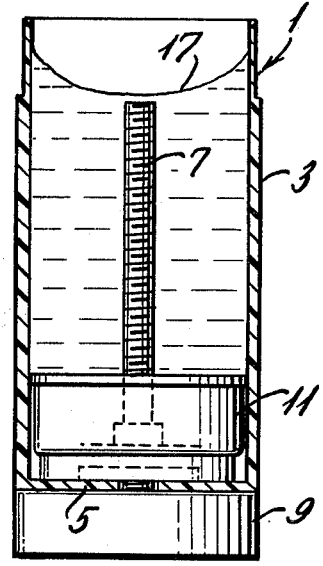
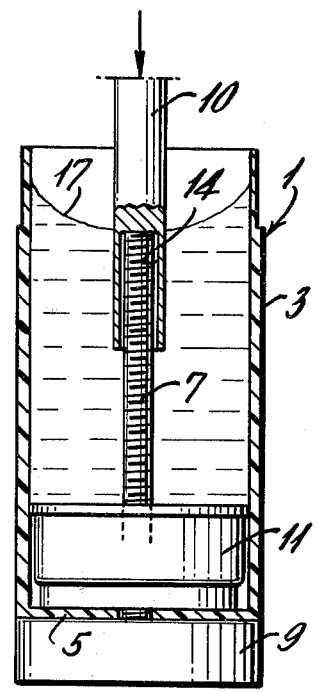
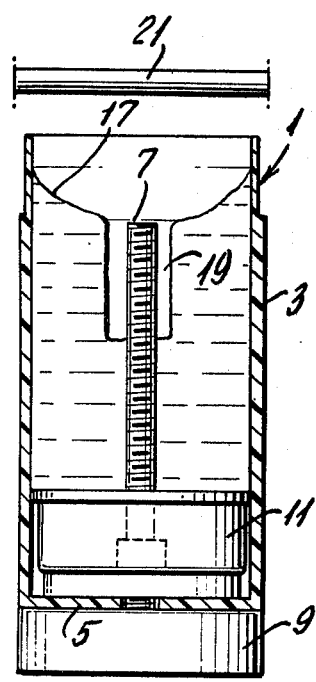
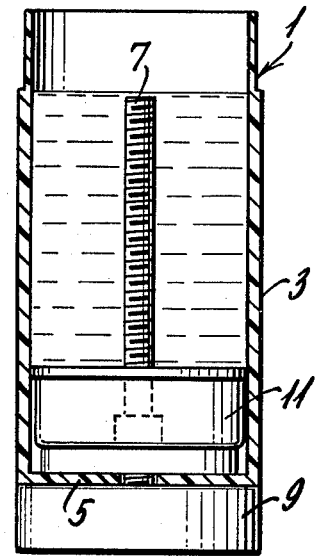
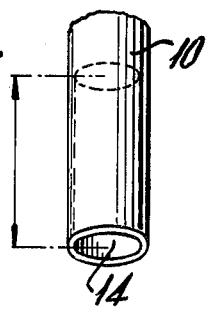
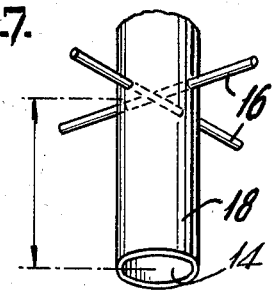
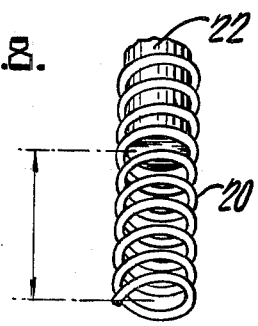

METHOD FOR ELIMINATING SHRINKAGE CAVITIES IN CAST COSMETIC STICKS AND SIMILAR PRODUCTS

This invention relates to a process for preparing wax-based stick applicators, i.e. applicators in solid stick form in which the backbone of the stick comprises a substantial quantity of waxy materials and which contains a substance or substances that are intended to be applied to a surface. The process of this invention, for example, is useful in preparing cosmetic, toiletry, pharmaceutical and household products in solid stick form. They include such products as antiperspirants, deodorants, depilatories, rubefacents, hair coloring, laundry detergents, cooking aids, furniture wax products, etc. However, for convenience of description the invention will be described in connection with the preparation of antiperspirant stick compositions of the aforesaid type.

It is known in the prior art to prepare antiperspirant compositions in the form of a rigid stick (see, for example, U.S. Pat. Nos. 3,255,082 and 3,259,545). These generally are made by mixing the active antiperspirant ingredients with a waxy type carrier, usually at elevated temperatures, to form a fluid mass. This is then poured into the stick dispenser shell and allowed to solidify to form a stick which may be applied from the dispenser shell.

A typical stick dispenser shell employed in this art comprises an outer cylindrical container to which is affixed a rotatable base, rotatable around the long axis of the cylindrical container. Secured to the inside surface of this rotatable base, there is provided a centrally disposed threaded post that passes upwardly through the floor of the cylindrical container. A threaded traveller member is also provided which rides up and down on the threaded post when the base member is rotated.

In filling stick dispenser shells of this character, it is customary to rotate the base member until the traveller member is in its lowest position on the central threaded post. The fluid material is then poured into the container and is allowed to harden.

It has been found, however, that when dispenser shells of this character are filled and allowed to solidify, as described above, relatively large cavities develop within the stick. These are generally formed adjacent the cross-sectional center of the stick at a point which is within the range of from about ¾ to 2 inches below the surface of the stick. This phenomenon has also been noted in filling dispenser shells of the so-called "push-up" type in which there is no central post or traveller member in the container. The cavities in the latter case appear to occur somewhat further below the surface than in the case of the dispenser shells having a center post.

The development of cavities within the sticks of the aforesaid type is obviously a disadvantage. In the first place, such sticks are inelegant in that during use the consumer will encounter the cavity as a hole. Furthermore, and perhaps more important, the cavity weakens the stick. As a consequence, in use it is often broken off along the cavity line when the user exerts some pressure when applying the cosmetic or toiletry.

It has now been found that the above disadvantages can be avoided if during the filling operation, after the material has been introduced into the dispenser shell and allowed to cool to form a semi-solid mass, a probe of hollow tubular form is inserted into the center of the semi-solid mass for a distance of from about ¾ to 2 inches and then removed. This is followed by a heating operation which partially remelts the material to re-establish a flat and uniform surface for the stick.

It is accordingly an object of the present invention to provide a process for producing products of the aforesaid type in solid stick form in which cavity formation within the stick material is substantially eliminated.

Other and more detailed objects of this invention will be apparent from the following description, claims and drawings wherein:

FIG. 1 is a longitudinal cross-sectional view of a dispenser shell employed in the present invention showing the level to which the dispenser is filled with fluid material containing, for example, the active antiperspirant material;

FIG. 2 is a view similar to that shown in FIG. 1 after the fluid material has been allowed to cool for some time and to harden into a semi-solid;

FIG. 3 is a view similar to that shown in FIG. 2 demonstrating the manner in which the probe is introduced into the partially solidified semi-solid stick material;

FIG. 4 is a view similar to that shown in FIG. 1 after the withdrawal of the probe showing the formation of a resulting cavity surrounding the upper end of the post of the dispenser;

FIG. 5 is a view similar to that shown in FIG. 4 but after a heat treatment; and FIGS. 6, 7 and 8 are various modifications of the probe employed in the present invention.

Referring now to FIG. 1 in which the numbers are employed to designate the same structure in the various views, the shell dispenser is shown generally at 1. This comprises a cylinderical container 3 open at the top and provided with a floor 5. Floor 5 is supplied with a centrally disposed hole through which passes a threaded post 7 described in more detail below.

Located below floor 5 of cylindrical container 3 is a rotatable base 9 which is rotatable with respect to cylindrical container 3. Threaded post 7 is secured to rotatable base 9 and turns as base 9 is rotated.

An internally threaded traveller member 11 is threaded onto post 7. This moves up and down on post 7 as base member 9 is rotated in one direction or the other.

In carrying out the process of the present invention in connection with the dispenser shell shown in the drawings, base 5 is rotated until traveller member 11 is in the low position shown in FIG. 1. The waxy material in fluid or molten form containing the ingredient or ingredients that are to be applied is fed into container 3 through filling heads 13. Container 3 is filled with fluid to about line 15 shown in FIG. 1.

The fluid material 8 in container 3 is allowed to cool for a period of time until the material has acquired a semi-solid consistency. The product mass which is compressible and pliable under thumb pressure is at this point non-pourable and has acquired the form of the dispenser. In the course of the cooling operation, the volume of the material in container 3 shrinks causing its upper surface to acquire a concave configuration best seen at 17 in FIG. 2. At the same time, the upper surface of post 7 becomes visually locatable when the filled container is viewed from the top.

After the surface of the mass has acquired the configuration shown in FIG. 2 and while the mass is still soft enough to be readily penetrated, a probe 10 is introduced into the mass. This is introduced so that the probe 10 encompasses the post 7 as the former is pushed into the semi-solid mass.

Probe 10 is a cylindrical hollow tube that is dimensioned so that it is somewhat larger in diameter than post 7. Probe 10 is pushed into the semi-solid mass of material contained in container 3 so that it encompasses the upper portion of post 7. Although probe 10 is illustrated as being a hollow cylinder, it is clear that it may also take other hollow tubular forms.

Probe 10 is inserted into the said semi-solid mass a predetermined distance. This may vary somewhat. Generally, this will be a distance in the range of about ¾ inch to 2 inches, and preferably ¾ inches from the surface of the semi-solid stick. Probe 10 is provided with a stop 14 that limits its downward movement into the semi-solid mass when stop 14 meets the top of post 7. In this fashion, the depth of which probe 10 is to be inserted into the semi-solid mass may be controlled.

After probe 10 has been inserted into the semi-solid mass the appropriate distance, it is then withdrawn leaving a cavity surrounding the upper end of post 7. This is best seen in FIG. 4 in which the cavity is designated as 19. To facilitate the withdrawal of probe 10, it may be heated.

After the stick has reached the stage in the processing shown in FIG. 4, it is then subjected to a heating operation to melt the material to re-establish the flat surface on the mass inside container 3 and to cover the upper end of the post 7. This is accomplished by means of heating lamps 21 shown in FIG. 4. The time and temperature required to re-establish the level of the mass can vary somewhat depending on the physical and chemical properties of the material in container 3. Ordinarily, however, the temperature will range in the vicinity of from about 110° F. to 900° F. and the period of time will be from two minutes to twenty-five minutes.

FIGS. 6, 7 and 8 illustrate various modifications of the probe that may be employed in the present invention. The probe of FIG. 6 is essentially the same probe as discussed above (probe 10).

The probe of FIG. 7 is provided with a plurality of fins 16 that pass through the center of tubular member 18. In this modification, the intersecting fins within tubular member 18 form a stop which would limit the downward movement of this probe when employed in the fashion that probe 10 is employed as illustrated in FIG. 3.

The probe shown in FIG. 8 takes the form of a coiled spring 20 which is also cylindrical in outline. In this modification the spring is provided with a plug 22 that is inserted into one of its open ends. Plug 22 also serves in this instance as a handle for operating this member as a probe.

The internal diameter of the probes employed in the present invention may vary somewhat. This will depend sometimes upon the size of the center post when the shell container employed has a center post. Generally, however, it will be in the range of from 0.220 to 0.600 inches. In the preferred case, the internal diameter will be about 0.30 inches.

The following Example is given to further illustrate the present invention. It is to be understood, however, that the invention is not limited thereto.

FT-300 Wax: As used herein, this refers to a wax of the Veba-Waxes Series "FT⇌" marketed by Dura Commodities. It is a saturated, synthetic hard paraffin of formula $CH_3(CH_2)_nCH_3$ and is chemically neutral, colorless and high melting. It is free from aromatic and unsaturated compounds and contains neither sulfur nor any halogens. Its structure is characterized as fine crystalline; its appearance in the solid state is white and opaque. It forms a clear solution in the common wax solvents at elevated temperatures; at room temperature it is practically insoluble and has the following properties:

| | |
|---|---|
| Molecular wt., osmometric, approx. | 730 |
| Congealing point, ° C., ASTM D-938 | 96–98 |
| Drop Point, ° C., ASTM D-127 | 107–111 |
| Penetration 25° C., ASTM D-1321 | 1 |
| Ball Pressure Hardness kg/cm² DIN 51 579 | 355/355 |
| Kinetic Viscosity, cstks, 120° C. (Vogel-Ossag) | 12 |
| Iodine No. | 0.1 |
| Acid Value, Saponification Value | nil |
| Color | white |
| Form | flakes |

This wax conforms to paragraph 121.2575 "Paraffin Synthetic" of the code of U.S. Federal Regulation to food and drug additives and is listed in the CTFA Dictionary page 321/322.

EXAMPLE 1

| | % by Wt. |
|---|---|
| 2-Ethylhexyl Palmitate | 45.72 |
| Titanium Dioxide | 0.23 |
| Stearyl Alcohol | 27.00 |
| Ft-300 Wax | 2.00 |
| PEG (25) Propylene Glycol Stearate | 2.00 |
| Butylate Hydroxytoluene | 0.05 |
| Aluminum Chlorohydrate Ultrafine Powder | 22.00 |
| Perfume | 1.00 |
| | 100.00 |

1. Combine 2-ethylene palmitate with titanium dioxide and mix in a Waring blender at medium speed for 5 minutes.

2. Transfer the mixture from step 1 into a suitable stainless steel steam-jacketed kettle and add aluminum chlorohydrate ultrafine powder using moderate lightning mixer agitation.

3. In another stainless steel steam-jacketed kettle, combine the FT-300 wax, stearyl alcohol, PEG (25) propylene glycol stearate and butylated hydroxytoluene. Melt until clear by heating to 210° F.

4. Add the contents of step 2 at 110° F. to step 3 at 210° F. under moderate agitation. A uniform homogeneous suspension results. Cool the batch to 125° F.

5. Add the perfume at 125° F. just before filling into containers.

6. Product Filling Instructions:

A. About 2.5 ounces of the product prepared are poured into the dispenser shell in the arrangement shown in FIG. 1 of the drawings. The filling temperature of the product is 125° F.±2° F. The dispenser shell has a diameter of 1.52 inches and is 4.00 inches high. The center post 7 in this case has an outside diameter of about 0.215 inches and is 2.8 inches long. When poured into the shell, the liquid level is about 0.60 inches above the upper margin of post 7.

B. The contents of the dispenser shell are allowed to cool for 15 minutes at 40° F. after which the contents of the shell dispenser has the appearance shown in FIG. 2.

C. A hollow tubular probe as shown in FIG. 3 is inserted into the cooled mass over the center post 7. The probe in this case has an inside diameter of about 0.30 inches and is inserted a depth of approximately ¾ inches.

D. The probe is then withdrawn leaving the void as shown in FIG. 4.

E. The filled shells resulting from step D are flamed under a 250 watt infrared lamp for one minute to eliminate voids made in step D. The sticks are kept at a distance of from 2-3 inches during this treatment.

To test the effectiveness of the present invention in eliminating the voids, the following experiment was carried out:

Using the formulation steps 1 through 5 of Example 1 and the filling steps 6A and 6B, 400 shell dispensers of the type shown in FIG. 1 were filled. Four sets, consisting of twenty units each were employed in the comparative testing procedure. The first set, identified as BX 1290-61A was used as a control and no probing was employed in forming the procedure.

The second set, identified as BX 1290-61B was further treated so that each unit, after step 6B, was penetrated at its center and to one side of the post for a depth of about ¾ of an inch with a microspatula. The microspatula employed in this procedure was a thin flat metalic strip about ¼ inch wide. This was followed by steps 6D and 6E.

The third set identified as BX 1290-61C was treated as described in Example 1. In this case, the hollow tubular probe employed was the modification shown in FIG. 7. In this case hollow tube as shown is cylindrical in shape having an inside diameter of about 0.30 inches. The fins 16 in this case projected for a distance of about one inch from the outer surface of the probe.

The fourth set identified as BX 1290-61D was processed according to steps 1 to 5 and 6A. In this case, however, no probing action was employed. Each unit in this case was capped and inverted. The contents of the dispenser shell was allowed to cool while the dispenser was maintained in the inverted position.

Each set of sticks formed as described above were evaluated for the presence of voids. This was done by cutting each stick in half, longitudinally and examining each for the presence of voids. The results of these comparative tests are summarized in the table below:

TABLE

| No Probing of the sticks (Control) BX 1290-61A | Regular Method Probe using Microspatula BX 1290-61B | New B.M. Probe BX 1290-61C | Inversion Method BX 1290-61D |
| --- | --- | --- | --- |
| Voids | | | |
| 20/20 | 16/20 | 3/20 | 20/20 |

In the case of BX 1290-61 C which is representative of this invention, the three units that developed the voids did so as a result of the breakage of the fins. However, it has been found that fins 16 may be eliminated from the probe without causing it to lose its effectiveness in reducing void formation. In other words, although the probe with fins 16 as shown in the modification of FIG. 7 is effective for the purpose of the present invention there is no criticality in fins 16. The probe without the fins as shown in the other modifications are equally as effective.

What is claimed is:

1. In a process for forming a wax-based stick applicator of the type comprising a waxy type carrier in which is distributed the ingredient or ingredients that are to be applied and that comprises forming a melt of said waxy type carrier containing said ingredient or ingredients and pouring salt melt into the opened portion of a dispenser container for said stick the improvement which comprises:
   (a) cooling said melt in said container portion until it forms a mass having a semi-solid consistency;
   (b) inserting a hollow tubular probe into said mass at about the center of the surface thereof and for a distance sufficient to encounter any voids that may have developed in said mass;
   (c) withdrawing said probe from said semi-solid mass whereby a cavity is formed in said mass extending downwardly from the surface thereof; and
   (d) heating said semi-solid mass to a temperature that is sufficiently high so that said material in said container portion melts, flows into and fills up the cavity formed in step (c) above.

2. A process according to claim 1 in which said probe is inserted into said semi-solid mass for a distance within the range of from about ¾ of an inch to 2 inches below the surface of said semi-solid mass.

3. A process according to claim 1 or 2 in which said container portion is provided with a centrally disposed post that extends upwardly from the bottom of said container portion and said tubular probe is inserted into said container portion in a fashion so that said probe surrounds said centrally disposed post.

4. A process according to claim 3 in which said stick is an antiperspirant stick that includes an effective amount of an antiperspirant material.

5. A process according to claim 3 in which said centrally disposed post is threaded along substantially its entire length and in which said container is also provided with a threaded traveller member that rides up and down on said post.

6. A process according to claim 3 in which said tubular probe has an internal diameter of about 0.220 to 0.600 inches.

* * * * *

UNITED STATES PATENT AND TRADEMARK OFFICE
CERTIFICATE OF CORRECTION

PATENT NO. : 4,147,750
DATED : April 3, 1979
INVENTOR(S) : Navin Geria and George Shaleesh It is certified that error appears in the above-identified patent and that said Letters Patent are hereby corrected as shown below:

Column 3, line 66, change "FT$\rightleftarrows$" to read -- "FT" --

Signed and Sealed this

*Eighteenth* Day of *September 1979*

[SEAL]

*Attest:*

*Attesting Officer*

LUTRELLE F. PARKER
*Acting Commissioner of Patents and Trademarks*